United States Patent
Namikata

(10) Patent No.: US 8,724,171 B2
(45) Date of Patent: May 13, 2014

(54) METHOD OF COMPRESSING COLOR REPRODUCTION RANGE AND PROFILE CREATION DEVICE USING SAME

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 13/454,483

(22) Filed: Apr. 24, 2012

(65) Prior Publication Data

US 2012/0293814 A1 Nov. 22, 2012

(30) Foreign Application Priority Data

May 19, 2011 (JP) ................................. 2011-112655

(51) Int. Cl.
*H04N 1/04* (2006.01)
(52) U.S. Cl.
USPC ............ 358/1.9; 358/1.15; 358/505; 358/474
(58) Field of Classification Search
USPC .................................. 358/1.9, 1.15, 505, 474
See application file for complete search history.

(56) References Cited

U.S. PATENT DOCUMENTS

| | | | |
|---|---|---|---|
| 5,933,253 A | 8/1999 | Ito et al. | ........................ 358/500 |
| 7,054,033 B2 | 5/2006 | Namikata | |
| 7,206,100 B2 | 4/2007 | Namikata | |
| 7,239,425 B2 | 7/2007 | Namikata | |
| 7,298,513 B2 | 11/2007 | Namikata | |
| 7,583,420 B2 | 9/2009 | Namikata | |
| 7,746,504 B2 | 6/2010 | Namikata | |
| 8,072,658 B2 | 12/2011 | Namikata | |
| 2008/0218779 A1* | 9/2008 | Shirasawa | ...................... 358/1.9 |
| 2009/0051985 A1* | 2/2009 | Matsuo | ......................... 358/539 |
| 2010/0097656 A1 | 4/2010 | Misawa et al. | |

FOREIGN PATENT DOCUMENTS

| | | |
|---|---|---|
| JP | 9-98298 | 4/1997 |
| JP | 2001-257900 | 9/2001 |

\* cited by examiner

*Primary Examiner* — Houshang Safaipour

(74) *Attorney, Agent, or Firm* — Fitzpatrick, Cella, Harper & Scinto

(57) ABSTRACT

To provide a gamut mapping method, the description of a correspondence relationship of which is more directly than that of a conventional method, the gamut mapping method being capable of performing fine control. A method of compressing a color reproduction range includes a step of allocating a vector representing a direction in which a color value on a grid point should shift in a uniform color space, to each grid point on the uniform color space and a step of finding a direction of shift for an input color value on the uniform color space based on the vector and mapping the input color value to a color reproduction range of an output device.

7 Claims, 19 Drawing Sheets

400

| BUILD SETTING | | |
|---|---|---|
| PROFILE FILE NAME | PrinterC1_20110413.icc | BROWS... 401 |
| COLORIMETRIC DATA FILE NAME | PrinterC1_20110413.dat | BROWS... 402 |
| OUTPUT DESTINATION PRINTER | PrinterC1 | SELECT 403 |

NUMBER OF GAMUT MAPPING LUT GRID POINTS
⦿ 17x17x17  404
○ 33x33x33

NUMBER OF PROFILE GRID POINTS
⦿ 17x17x17  405
○ 33x33x33

MAXIMUM LOADED AMOUNT OF TONER / INK   [240] %  406

AMOUNT OF BLACK GENERATION
| Standard ▼ | 407
| Minimum |
| Maximum |
| Custom |

SPECTROCOLOR- IMETER TYPE
| X-Rite Eye-One ▼ | 408
| Gretag Macbeth SpectroLino |
| X-Rite il iSis |
| X-Rite il IO |

409  [ START ]   [ CANCEL ]

FIG.4

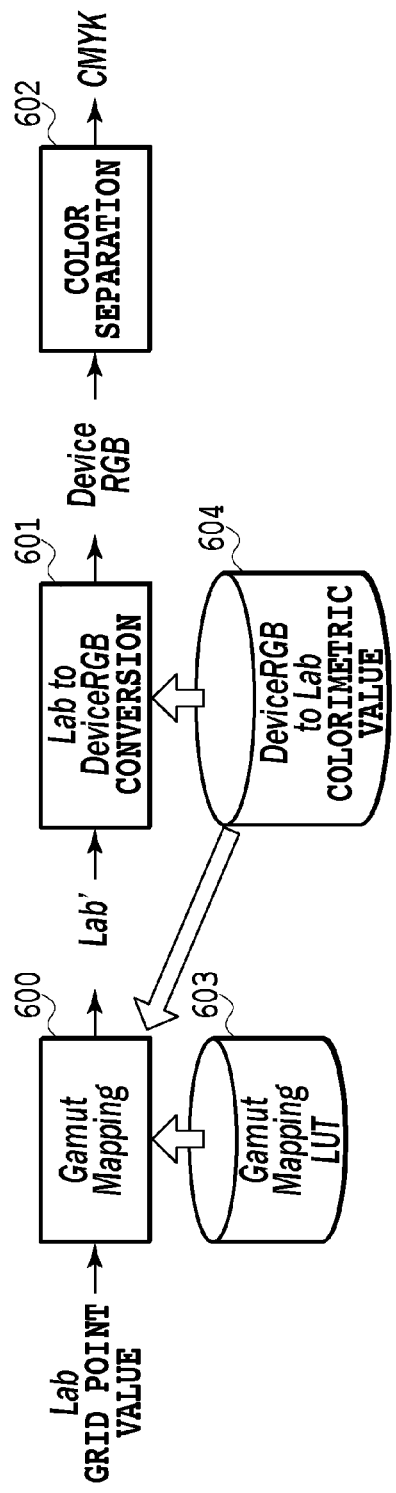
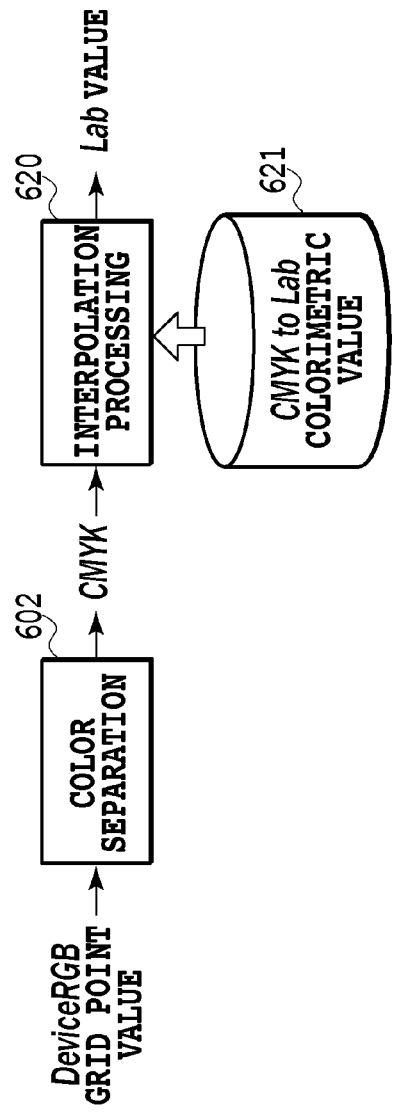
FIG.6A
FIG.6B

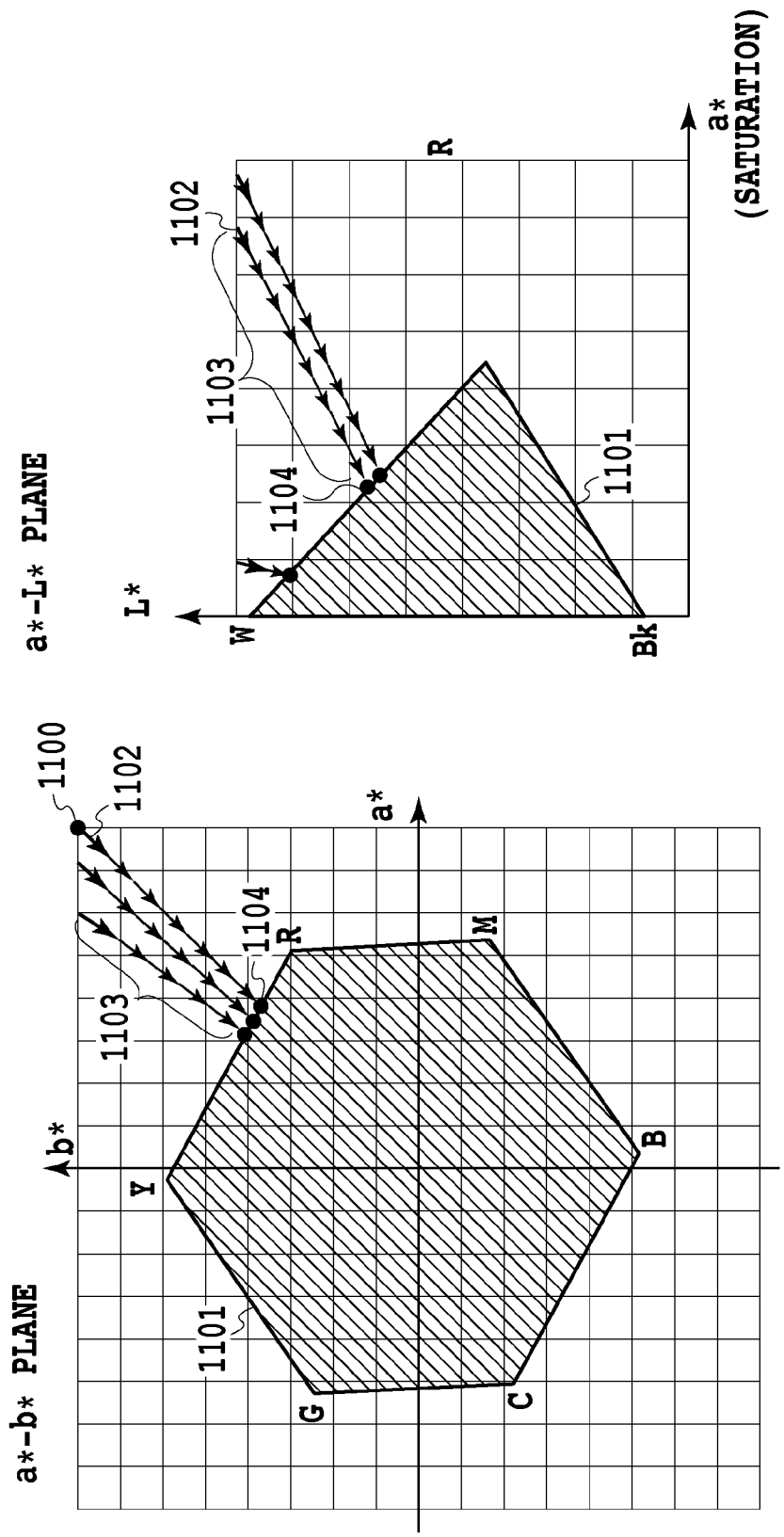

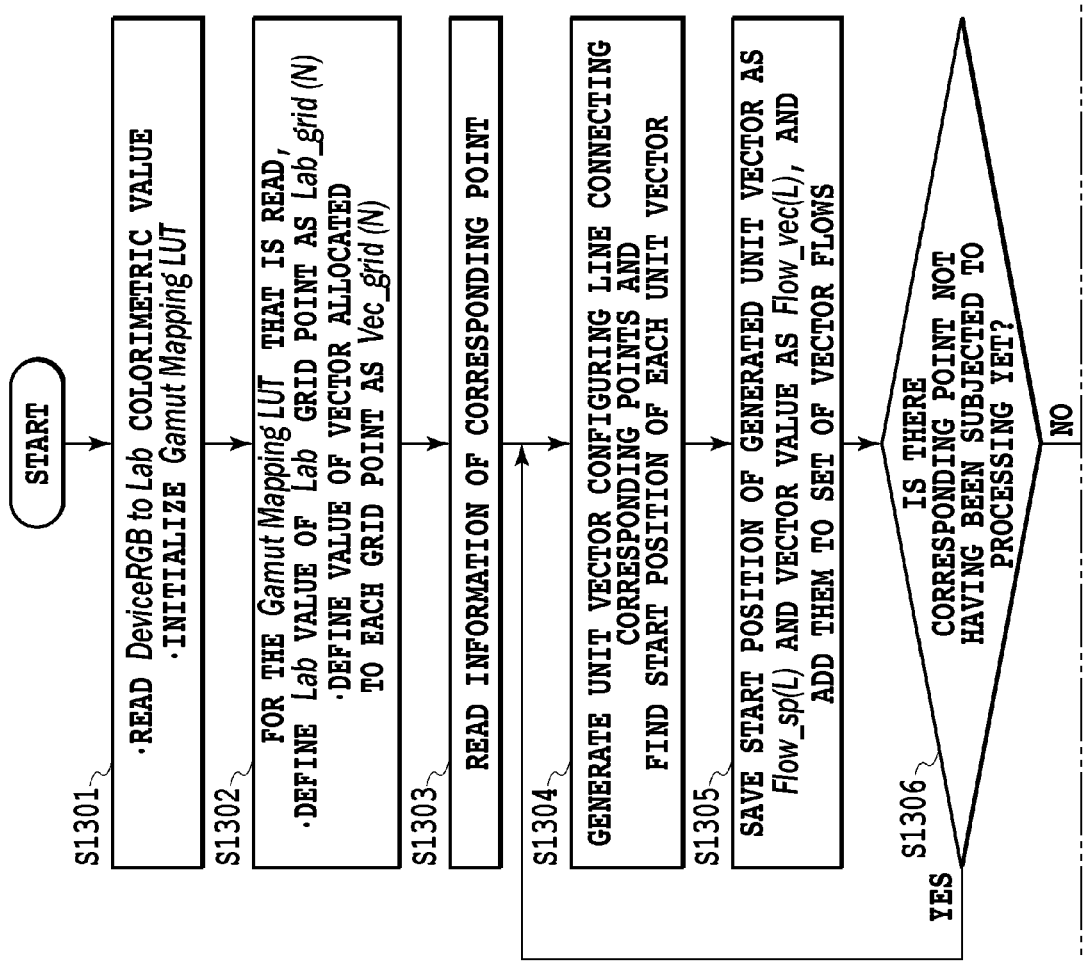

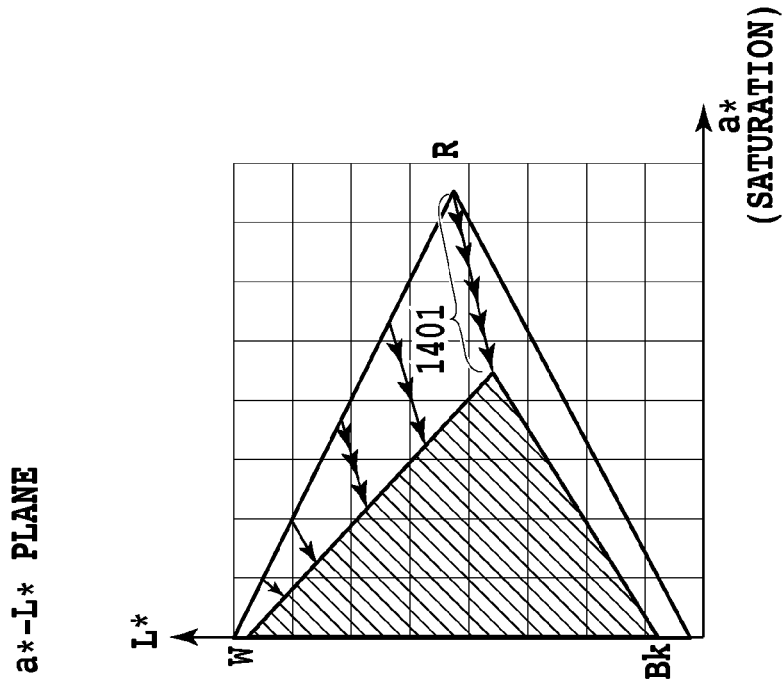
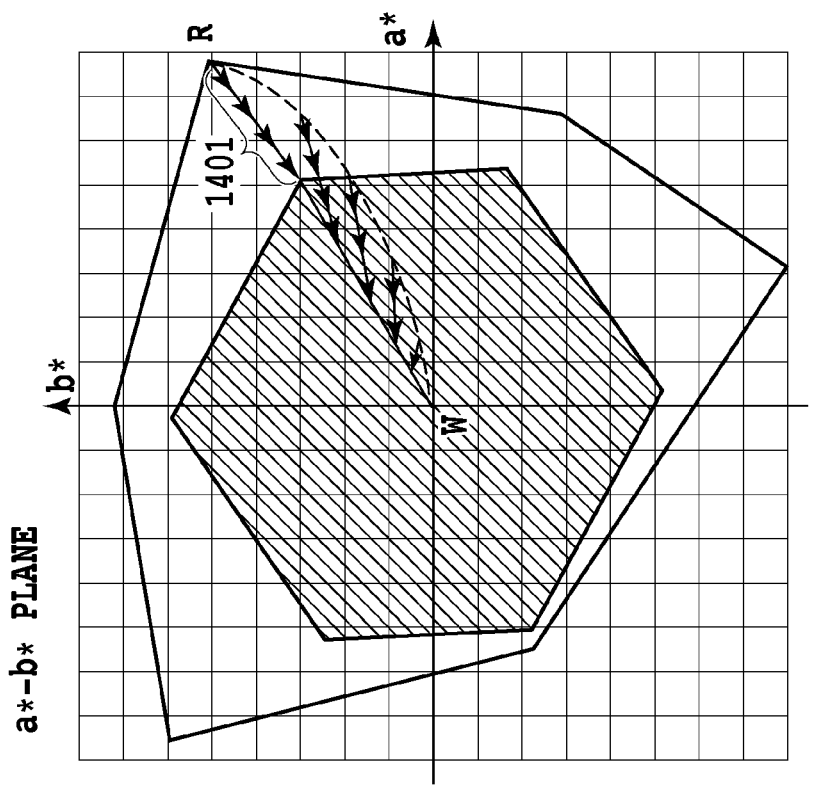
FIG. 14A
FIG. 14B

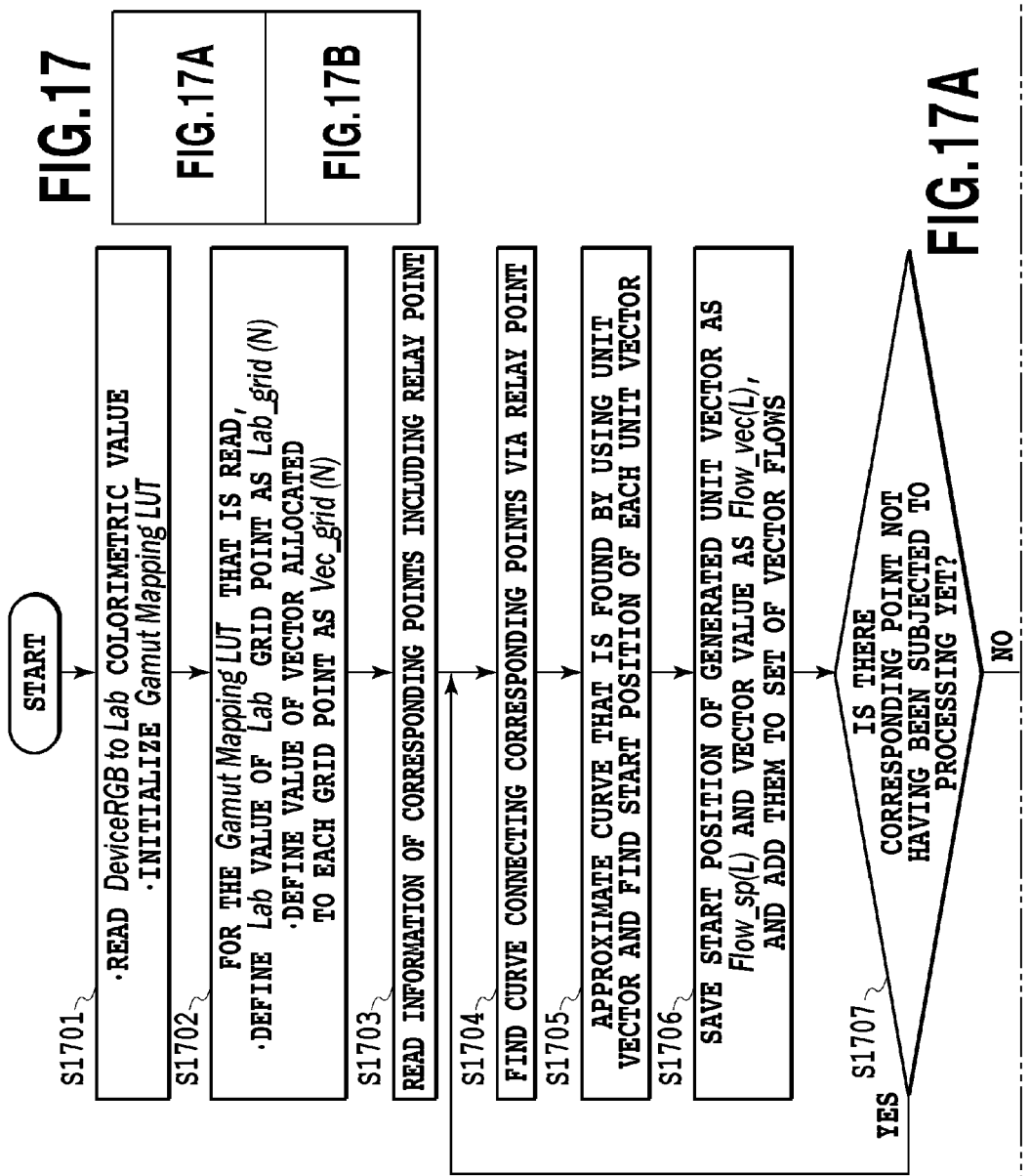

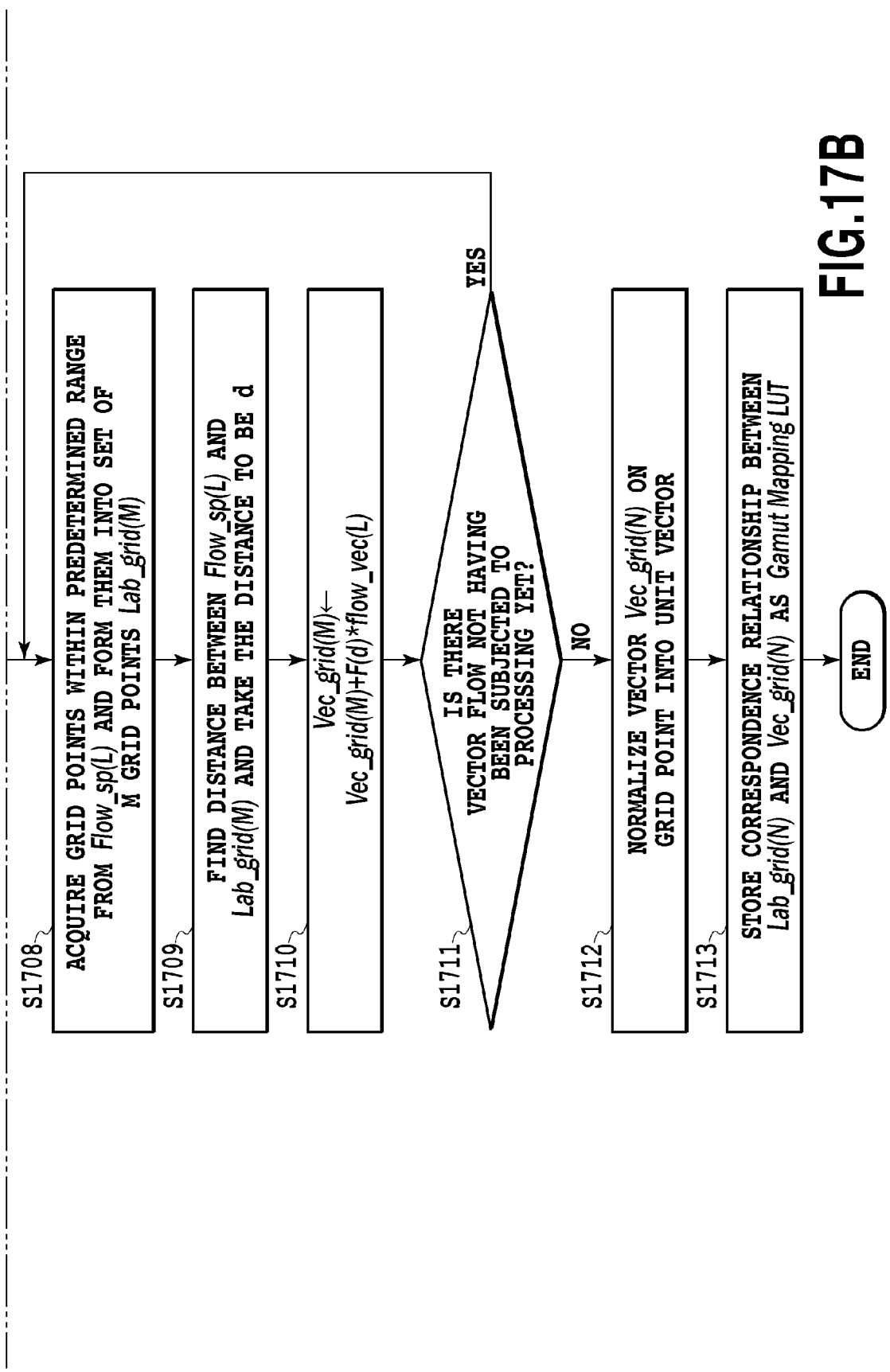

METHOD OF COMPRESSING COLOR REPRODUCTION RANGE AND PROFILE CREATION DEVICE USING SAME

BACKGROUND OF THE INVENTION

1. Field of the Invention

The present invention relates to a method of compressing a color reproduction range in creating a color profile used for color matching of a color image forming device.

2. Description of the Related Art

The electrophotographic recording type printer (image forming device) that forms images on a recording medium such as paper by using color toners of Cyan, Magenta, Yellow, and Black adopts the subtractive color mixing as the principle of color reproduction, in which the color tones absorb the reflected light from the recording medium to develop a color. In general, the color reproduction range in an output device such as an image forming device (hereinafter, referred to as the "printer color reproduction range") tends to be narrower than the color reproduction range in an input device such as a monitor that adopts the additive color mixing as the principle of color reproduction, in which spontaneous light develops a color.

Because of the above, a number of technologies referred to as gamut mapping are proposed, in which colors that cannot be represented by an image forming device are compressed to a color reproduction range that can be represented by the image forming device.

As the most primitive technique thereof, there is a method in which colors in a color reproduction range to be mapped (hereinafter, referred to as the "source color reproduction range") are compressed in the direction of saturation while preserving the brightness and hue and mapped to the printer color reproduction range in the Lab color space represented by the brightness, saturation, and hue and perceptually uniform. There is also a technique in which colors in the source color reproduction range are compressed toward a virtual convergent point provided inside of the printer color reproduction range and mapped to the printer color reproduction range.

Furthermore, a technique that is an improved primitive technique is also proposed. For example, a technique is proposed in which a method of compressing colors in the saturation direction while preserving the brightness and hue and a method of compressing colors toward the virtual convergent point provided inside of the printer color reproduction range are switched in accordance with the brightness of the colors in the source color reproduction range on the Lab color space (see Japanese Patent Laid-Open No. 2001-257900).

In addition, there is also proposed a technology for performing gamut mapping by variously setting virtual convergent points within the printer color reproduction range in accordance with the position of the color in the source color reproduction range on the Lab color space (see Japanese Patent Laid-Open No. H09-098298 (1997)).

The technologies described in Japanese Patent Laid-Open No. 2001-257900 and Japanese Patent Laid-Open No. H09-098298(1997) are those that determine the mapping direction from the source color reproduction range to the printer color reproduction range, based on the geometric rules on the uniform color space such as the Lab color space, and a number of technologies other than those described above are proposed.

However, the geometric rules disclosed in Japanese Patent Laid-Open No. 2001-257900 and Japanese Patent Laid-Open No. H09-098298(1997) are determined by extending the correspondence relationship between the source color reproduction range and the printer color reproduction range defined as to a comparably small number of colors, for example, YMCKRGB, into a large region. Consequently, it is not necessarily possible to appropriately define the correspondence relationship as to colors other than those regarded as important when determining rules.

Furthermore, in many cases, the geometric rules are determined after the uniform color space represented three-dimensionally is degenerated to a two-dimensional plane. Because of this, for example, even in a case where it is appropriate to map a color existing on a certain hue plane in the source color reproduction range to a color existing on another hue plane in the printer color reproduction range, such mapping cannot be implemented.

Moreover, when trying to solve the problems as described above by introducing various rules, there newly occurs such a problem in which the rule design becomes too complicated.

SUMMARY OF THE INVENTION

A method of compressing a color reproduction range according to the present invention includes a step of allocating a vector representing a direction in which a color value on a grid point should shift in a uniform color space, to each grid point on the uniform color space and a step of finding a direction of shift for an input color value on the uniform color space based on the vector and mapping the input color value to a color reproduction range of an output device.

According to the present invention, it is possible to implement gamut mapping capable of performing more precise control without setting complicated rules.

Further features of the present invention will become apparent from the following description of exemplary embodiments (with reference to the attached drawings).

BRIEF DESCRIPTION OF THE DRAWINGS

FIG. 4 is a diagram showing an example of a setting screen when creating a profile;

FIGS. 6A and 6B are diagrams each showing an operation flow of profile creation;

FIGS. 11A and 11B are diagrams each showing examples of a gamut mapping processing result;

FIGS. 14A and 14B are diagrams each showing examples of a vector flow;

FIG. 17 is a flowchart showing a relationship between FIGS. 17A and 17B, and FIGS. 17A and 17B are flowcharts showing a flow of gamut mapping lookup table creation processing according to the third embodiment.

DESCRIPTION OF THE EMBODIMENTS

Hereinafter, embodiments for embodying the present invention will be explained by using the drawings.

[First Embodiment]

Figure 1:
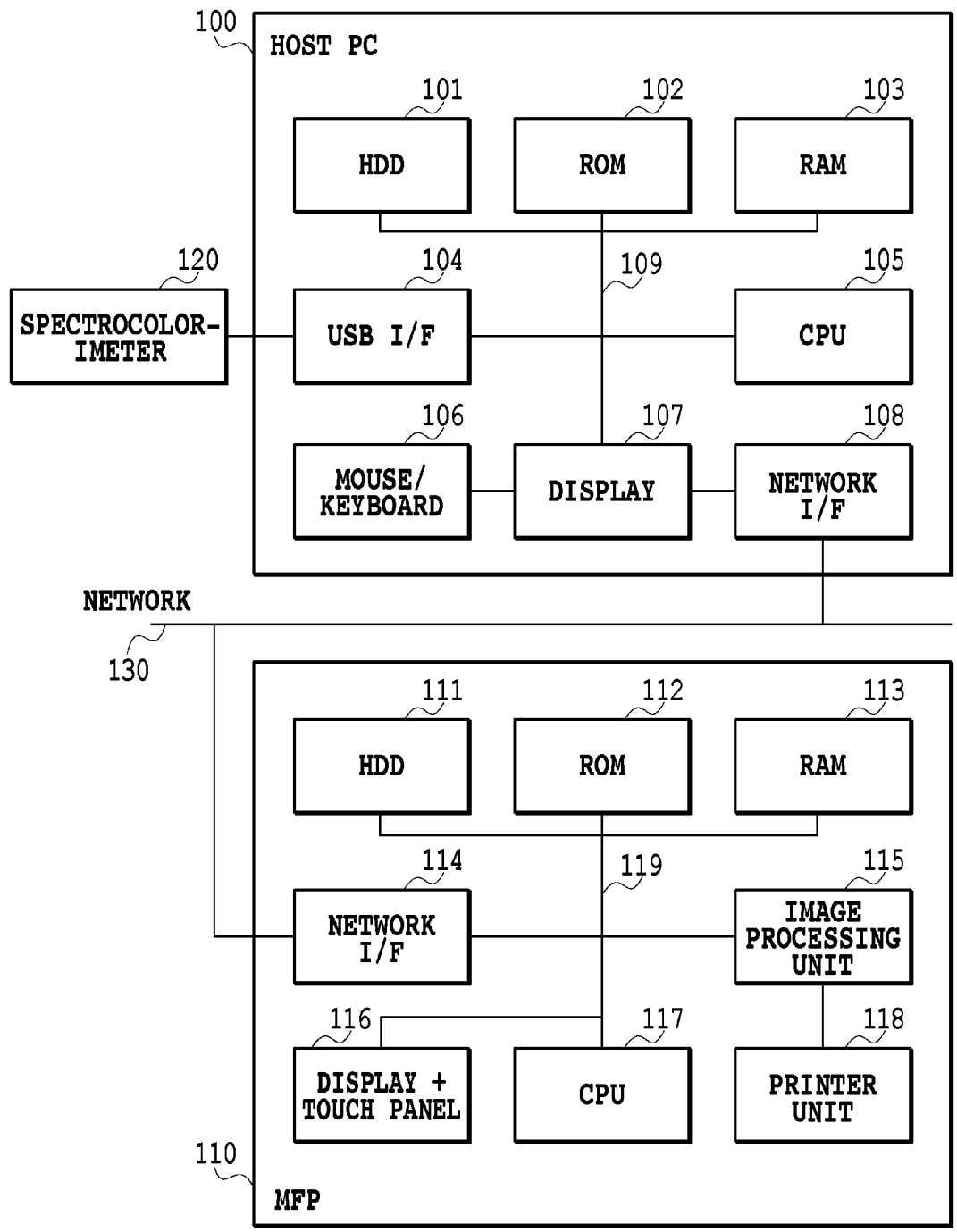
FIG. 1 is a diagram showing an example of a system configuration.

FIG. 1 is a diagram showing an example of a system configuration for implementing compression of a color reproduction range according to a first embodiment.

This system includes two main components, that is, a host PC 100 and an MFP (Multi Function Peripheral) 110, and the host PC 100 and the MFP 110 are connected via a network 130.

The host PC 100 is a host computer which performs processing for creating/adjusting a profile, and to which a spectrocolorimeter 120 is connected.

The host PC 100 includes an HDD 101, a ROM 102, a RAM 103, a USB I/F 104, a CPU 105, a mouse/keyboard 106, a display 107, a Network I/F 108, and an internal bus 109.

The HDD 101 is a storage device that stores programs and data.

The ROM 102 is a memory that stores programs at the time of start of the host PC 100.

The RAM 103 is a memory that stores programs read from the HDD 101 or the ROM 102 and temporarily stores data when programs are executed.

The USB I/F 104 serves as an interface of connection with an external device.

The CPU 105 is a processor configured to control each part by executing various programs.

The mouse/keyboard 106 is an input unit that receives an input from a user.

The display 107 is a display unit that displays the status of input information, a processing result, or the like.

The Network I/F 108 performs an operation to interface with the network 130.

The internal bus 109 is a bus that connects each part described above.

The spectrocolorimeter 120 is connected to the host PC 100 via the USB I/F 104 and measures a color value in accordance with predetermined command communication from the host PC 100.

The MFP 110 performs printing processing in accordance with a print instruction and print data from the host PC 100 received through the network 130.

The MFP 110 includes an HDD 111, a ROM 112, a RAM 113, a Network I/F 114, an image processing unit 115, a display +touch panel 116, a CPU 117, a printer unit 118, and an internal bus 119.

The HDD 111 is a storage device that stores programs and data.

The ROM 112 is a memory that stores programs at the time of start of the MFP 110.

The RAM 113 is a memory that stores programs read from the HDD 111 or the ROM 112 and temporarily stores data when programs are executed.

The Network I/F 114 performs an interface operation with the network 130.

The image processing unit 115 converts print data received via the Network I/F 114 into an image suitable for printing processing in the printer unit 118.

The display+touch panel 116 has a function of a display unit configured to display the status of input information, a processing result, or the like, and a function of an input unit that receives an input from a user.

The CPU 117 is a processor configured to control each unit by executing various programs.

The printer unit 118 prints an image on a recording medium (paper) based on the CMYK data converted in the image processing unit 115. The recording method of the printer unit 18 includes an electrophotographic method, an inkjet method, or the like.

The internal bus 119 is a bus that connects each unit described above.

Figure 2:
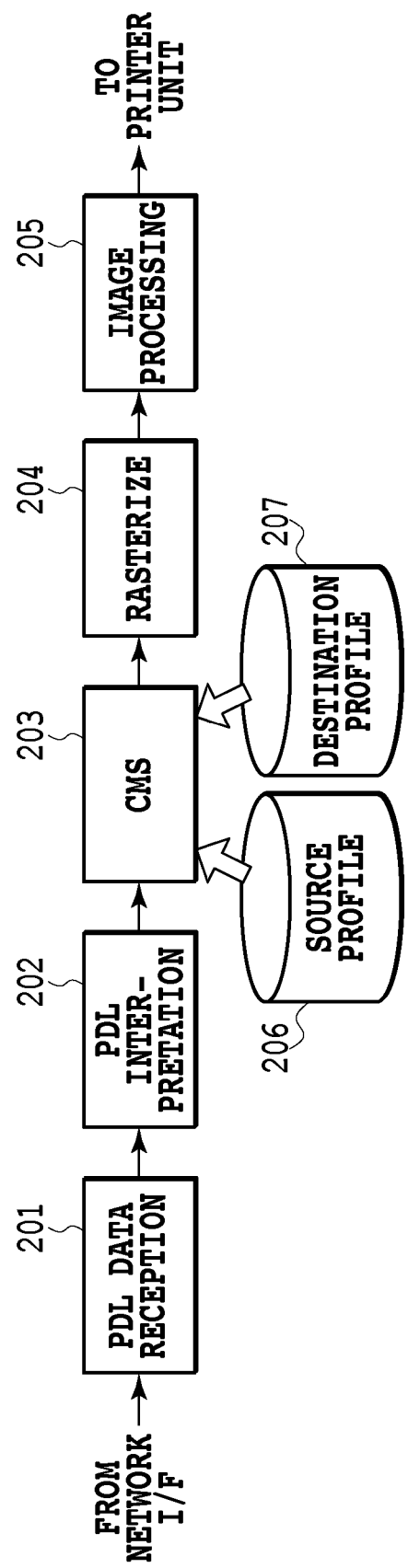
FIG. 2 is a diagram showing a flow of processing from reception of print data to printing processing in an MFP.

Next, a flow of processing from reception of print data to printing processing operation by the MFP 110 will be explained by using FIG. 2. It should be noted that this processing is implemented by the CPU 117 executing a program read from the HDD 111 to the RAM 113.

First, the CPU 117 receives print data (PDL data) from the host PC 100 via the Network I/F 114 and stores the data in the RAM 113 (201).

Next, the CPU 117 interprets the stored PDL data (202).

The PDL data has color values such as the RGB values and CMYK values, for each piece of data to draw an image. Next, the CPU 117 performs CMS processing for reproducing the color values by a printer (203). Specifically, by the combination of a source profile (206) indicating color information of a monitor or an offset printing machine and a destination profile (207) indicating color information of the printer, the CPU 117 performs processing for creating color information for reproducing the color of the monitor or the printing machine by the printer. The profile created by the host PC 100 is transferred onto the HDD 111 of the MFP 110 and used as a destination profile of the CMS processing.

After completing the CMS processing, the CPU 117 performs rasterize processing (204). That is, the CPU 117 performs processing for developing the PDL data having been CMS-processed into bit map data of an image in accordance with the resolution of the printer unit 118.

Then, the CPU 117 sends the developed bit map data to the image processing unit 115. After the image processing unit 115 performs image processing suitable for the printer unit 116, the image is transferred to the printer unit 118 (205).

Figure 3:
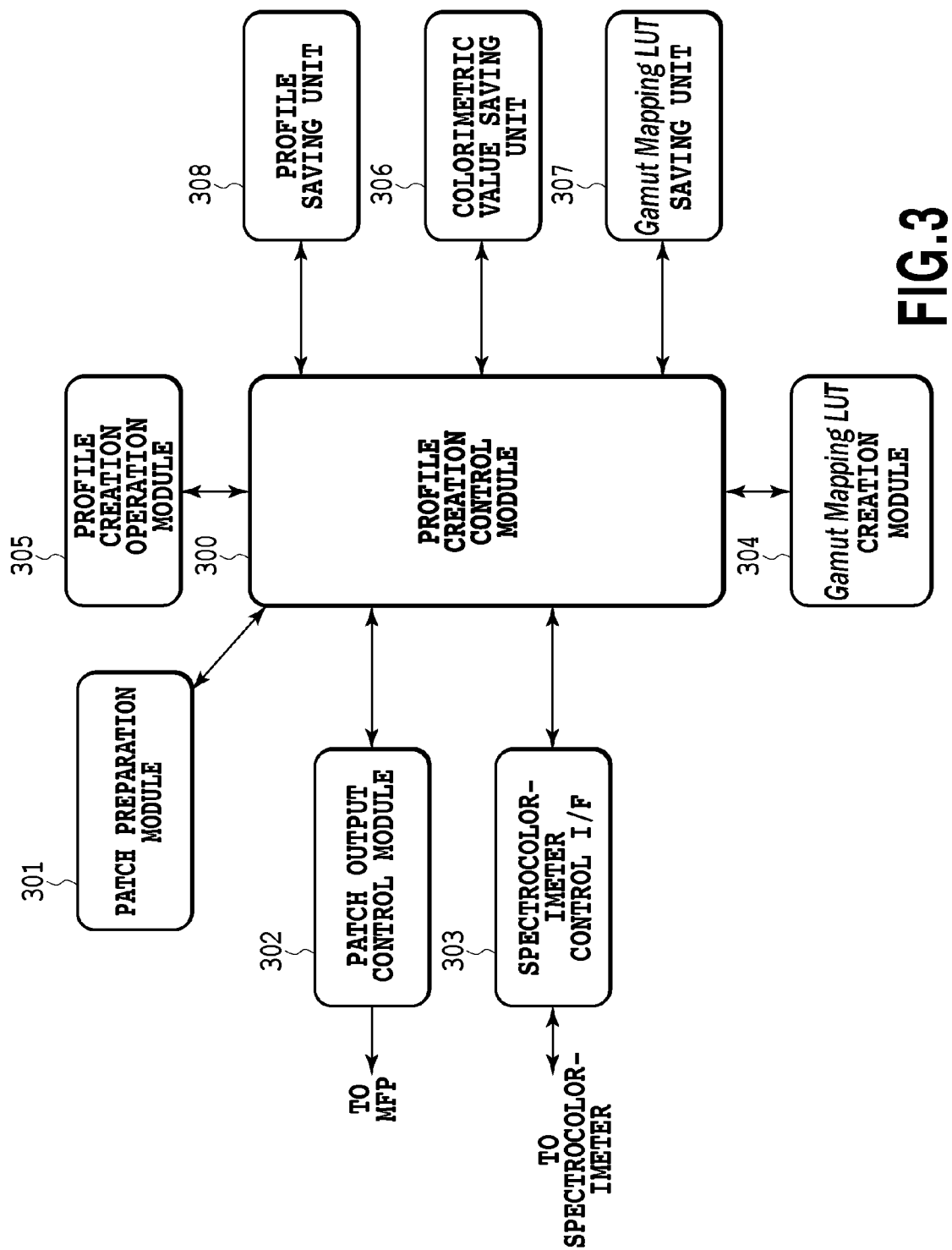
FIG. 3 is a diagram showing a software module configuration of a profile creation device.

Next, a software module configuration of a profile creation device, which is implemented as a program that operates on the host PC 100, will be explained by using FIG. 3.

A profile creation control module 300 is in charge of the total control of profile creation processing and totally controls each module and each unit described below. That is, the profile creation control module 300 controls a patch preparation module 301, a patch output control module 302, a gamut mapping LUT creation module 304, and a profile creation operation module 305. Furthermore, the profile creation control module 300 controls a spectrocolorimeter control I/F 303, a colorimetric value saving unit 306, a gamut mapping LUT saving unit 307, and a profile saving unit 308. Hereinafter, processing in each module and each unit will be explained.

The patch preparation module 301 creates patch image data for creating a profile based on type information of the spectrocolorimeter 120. The created patch image data is sent to the profile creation control module 300 and sent to the patch output control module 302 via the profile creation control module 300.

The patch output control module 302 sends, to the MFP 110, the patch image data received from the profile creation control module 300 together with an print instruction to the effect that the data is output without performing the CMS. The MFP 110 outputs the patch image data based on the received print instruction. Then, the measurement of the patch on the patch image output from the MFP 110 is controlled via the spectrocolorimeter control I/F 303. The obtained colorimetric value is sent to the profile creation control module 300. The profile creation control module 300 delivers the obtained colorimetric value to the colorimetric value saving unit 306. The colorimetric value saving unit 306 stores the delivered colorimetric value information in the HDD 101.

The gamut mapping LUT creation module 304 creates a gamut mapping LUT which is information for performing color reproduction range compression based on the patch signal value of the patch image data (CMYK value), the colorimetric value of the patch image (Lab value), and information of predetermined parameters. The created gamut mapping LUT is sent to the gamut mapping LUT saving unit 307 via the profile creation control module 300 and stored/saved in the HDD 101 by the gamut mapping LUT saving unit 307. "LUT" is the abbreviation for the lookup table.

The profile creation operation module 305 creates a profile based on the patch signal value of the patch image data (CMYK value), the colorimetric value of the patch image (Lab value), the gamut mapping LUT, and information of predetermined parameters. The created profile is sent to the profile saving unit 308 via the profile creation control module 300 and stored/saved in the HDD 101 by the profile saving unit 308.

Next, parameters that are referred to at the time of creation of the gamut mapping LUT and profile will be explained.

FIG. 4 shows an example of a profile creation setting screen (Build setting screen) that is displayed on the display 107 in order to cause a user to input a parameter to be used etc.

In a Build setting screen 400, fields, checkboxes, etc., for inputting various setting values are included.

Reference numeral 401 represents a text field for inputting a file name when saving a created profile and 402 represents a text field for inputting a file name when saving colorimetric data. Then, reference numeral 403 represents a field for specifying a printer that is a target of profile creation.

Reference numeral 404 represents checkboxes for specifying the number of grid points of the gamut mapping LUT and 405 represents checkboxes for specifying the number of grid points of LUT of Lab to CMYK of a profile.

Reference numeral 406 represents a field for specifying a maximum amount of a toner or an ink, which is a setting of a color separation table when creating LUT of Lab to CMYK. Here, 240% is specified with respect to the theoretical upper limit value of 400%.

Then, reference numeral 407 represents a field for specifying an amount of black generation and 408 represents a field for specifying the type of a spectrocolorimeter.

Reference numeral 409 represents a start button for starting the profile creation operation.

Next, the patch image data prepared in the patch preparation module 301 will be explained.

Figure 5:
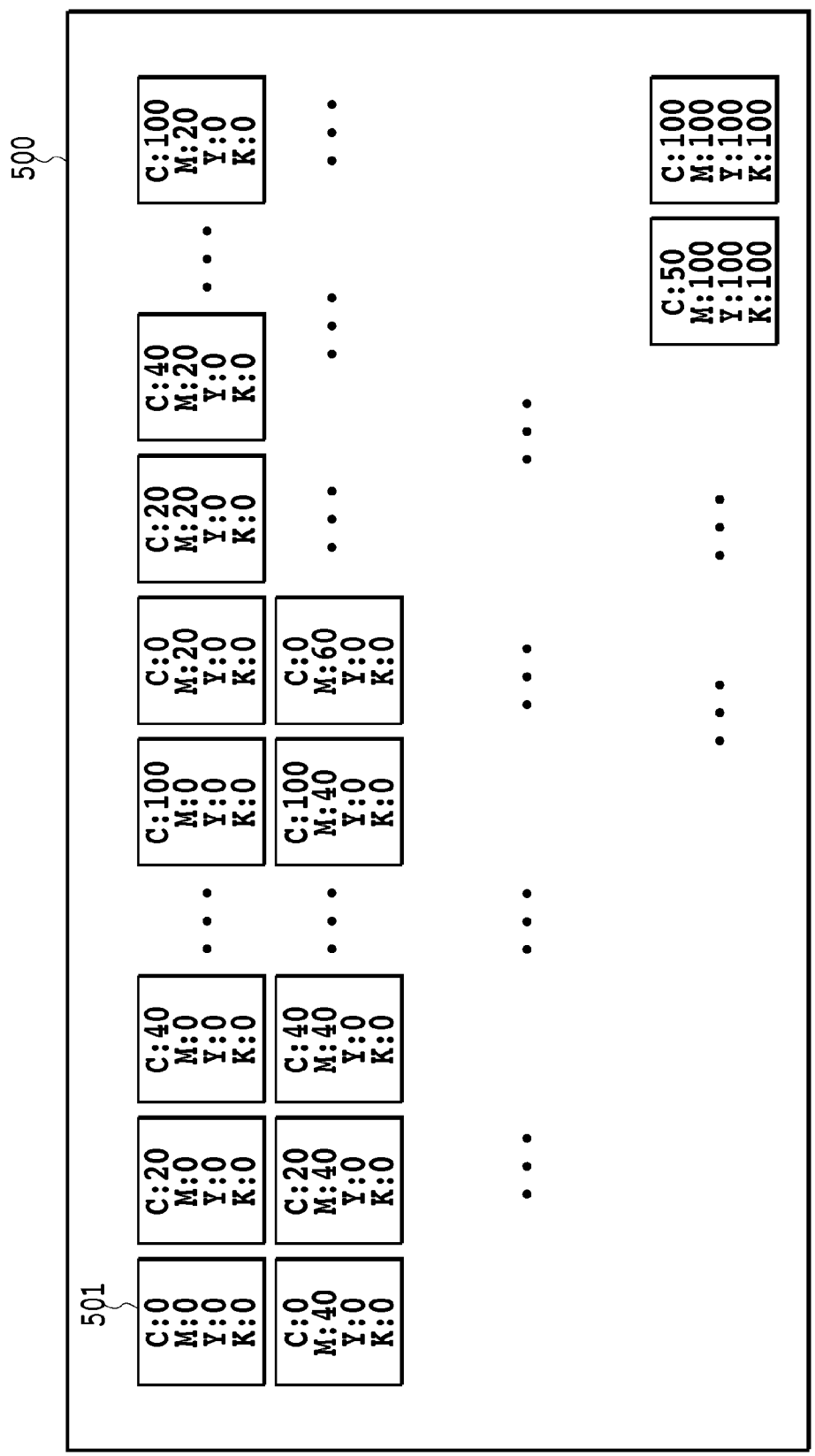
FIG. 5 is a diagram showing an example of patch image data.

FIG. 5 is a diagram showing an example of created patch image data.

The patch preparation module 301 first creates an image total frame 500 in accordance with the sheet size of the printer and arranges patches within the image total frame 500 in accordance with the type of the spectrocolorimeter 120 to be used. Here, regarding the number of patches to be arranged, it is assumed that in CMYK, CMY have the same division numbers and the division numbers of CMY are the following combinations in accordance with density of K.

| K | CMY |
|---|---|
| 0 | 6 × 6 × 6 |
| 20 | 6 × 6 × 6 |
| 40 | 6 × 6 × 6 |
| 60 | 6 × 6 × 6 |
| 80 | 4 × 4 × 4 |
| 100 | 3 × 3 × 3 |

When the division numbers are 6×6×6, the signal values that CMY take are 0, 20, 40, 60, 80, and 100(%), and thus the number of combinations of CMY is 216. When the division numbers are 4×4×4, the signal values that CMY take are 0, 33, 66, and 100(%), and thus the number of combinations of CMY is 64. When the division numbers are 3×3×3, the signal values that CMY take are 0, 50, and 100(%), and thus the number of combinations of CMY is 27. Consequently, the total number of patches is 955. Regarding an increment in CMY, it is assumed that the value is incremented in the order of C, M, Y, and K. In a patch 501 in the uppermost and leftmost position, CMYK=(0, 0, 0, 0), that is, nothing is printed in the patch.

It is assumed that the profile in the present invention has LUT for converting a device independent color space into a device dependent color space and that in the present embodiment, the Lab color space typical as the uniform color space is used as a device independent color space and the CMYK color space is used as a device dependent color space. Consequently, it is assumed that LUT the profile has as described above is LUT of Lab to CMYK, in which CMYK data is stored on the three-dimensional Lab grid points divided uniformly. It is also assumed that the number of grind points at this time takes values such as 17×17×17 and 33×33×33, as shown in FIG. 4, but the number is not limited to these. Furthermore, as will be described later, processing for creating LUT of Lab to CMYK includes color separation processing for RGB to CMYK, but when it is assumed that color separation processing is not included in the profile, it may be possible to assume that the profile has a format of Lab to RGB. Moreover, the device independent color space may be the JCh color space that has introduced a model, the colors of which can be seen, such as Luv or CIECAM 02 which is a uniform color space other than Lab.

Next, the format of the gamut mapping LUT will be explained. As in the case of LUT the profile has, the gamut mapping LUT is also LUT having three-dimensional grid points. The value on the grid point this LUT has is a vector value in the Lab color space indicating the direction in which the Lab value of the grid point should shift. The vector value all the grid points have is the unit vector and the direction of the shift is approximately toward the color reproduction range of the printer. Meanwhile, in the present embodiment, it is assumed that the number of grid points of the gamut mapping LUT is set independently of the number of grid points of the profile, but it may also be possible to set the number of grid points so as to be the same number of the grid points of the profile instead of setting them independently.

Next, the processing flow of profile creation in the profile creation operation module 305 will be explained. A profile is created by obtaining the patch signal value (CMYK value), the patch colorimetric value (Lab value), and information of set parameters from the profile creation control module 300.

FIG. 6A is a block diagram showing a processing flow to create Lab to CMYK LUT of a profile. The profile creation operation module 305 creates the Lab to CMYK LUT by each processing of gamut mapping processing 600, Lab to DeviceRGB conversion processing 601, and color separation processing 602.

In the profile creation flow, the profile creation operation module 305 first creates Lab grid point values in accordance with the set parameter. When the set number of grid points is 17×17×17, the values are generated so that the value of L is incremented by every 6.25 from 0 to 100 and the values of a and b are incremented by every 16 from −128 to 128 and the values are generated in ascending order of b, a, and L. When the set number of grid points is 33×33×33, the values are generated so that the value of L is incremented by every 3.125 from 0 to 100 and the values of a and b are incremented by every 8 from −128 to 128 and the values are generated in ascending order of b, a, and L. Meanwhile, it is sufficient if the correspondence relationship between Lab values and the CMYK values can be defined finally, and thus the ascending order (or descending order) of L, a, and b is not limited to the above.

The Lab value the Lab grid point value takes is wider than the color reproduction range of the printer, and thus, first, color space compression is performed by the gamut mapping processing. In the gamut mapping processing 600, the generated Lab grid point values are subjected to color space compression by using information of a DeviceRGB to Lab colorimetric value table 604 and a gamut mapping LUT 603. Detailed algorithm will be described later.

Here, the DeviceRGB to Lab colorimetric value table 604 is a three-dimensional LUT to which the DeviceRGB value is input and from which the Lab value is output, and is information for determining the color reproduction range of the printer. Before the processing for creating the Lab to CMYK LUT (specifically, after colorimetry of the patch image is performed), the processing for finding the DeviceRGB to Lab colorimetric value table 604 is performed and the DeviceRGB to Lab colorimetric value table 604 is stored on the HDD 101 via the colorimetric value saving unit 306.

FIG. 6B is a block diagram showing a processing flow to find the DeviceRGB to Lab colorimetric value table 604. First, the DeviceRGB grid point values are generated. When the number of grid points is, for example, 33×33×33, the DeviceRGB grid point value is incremented by every 8 from 0 to 255 and generated in ascending order of B, G, and R. The DeviceRGB values generated in this manner are converted into the CMYK values by the color separation processing 602. At this time, the parameter to be used in the color separation processing 602 is the same as the parameter used in the profile creation flow. After that, interpolation processing 620 using the CMYK to Lab colorimetric value table 621 as LUT is performed, and thus the Lab value corresponding to the CMYK value subjected to color separation processing is obtained. Meanwhile, the CMYK to Lab colorimetric value table 621 is LUT in which the patch signal value (CMYK value) in the patch image and the colorimetric value (Lab value) saved by the colorimetric value saving unit 306 are associated with each other. In this manner, the DeviceRGB to Lab colorimetric value table 604 is found.

In contrast, the gamut mapping LUT 603 is a Lab to Lab lookup table. The creation flow of the gamut mapping LUT 603 will be explained later in detail.

Explanation is returned to the profile creation flow.

In the Lab to DeviceRGB conversion processing 601 following the gamut mapping processing 600, the Lab value having been subjected to color space compression is inversely converted into the DeviceRGB value which is a color value in the color space dependent on the output device through the use of the DeviceRGB to Lab colorimetric value table 604 found as described above. The operation of this inverse conversion also includes various methods that are already known and any method may be used.

Finally, by the color separation processing 602, the DeviceRGB value is converted into the CMYK value based on the information of the maximum amount of a toner or an ink and the amount of ink set in the Build setting screen described above.

By the above processing, the CMYK value corresponding to the Lab grid point value is calculated and the profile is completed.

In the manner described above, the profile creation control module 300 creates a profile and the created profile and colorimetric value information are stored/saved in the HDD 101 by the profile saving unit 308.

Figure 7:
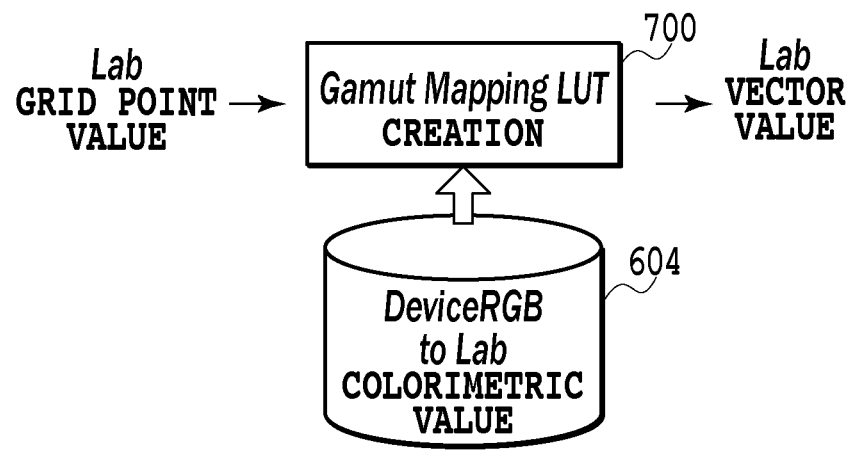
FIG. 7 is a diagram showing a processing flow to find a gamut mapping lookup table.

Next, the creation flow of the gamut mapping LUT 603 in the gamut mapping LUT creation module 304 will be explained. The creation of the gamut mapping LUT 603 is performed by acquiring the DeviceRGB to Lab colorimetric value table 604 from the profile creation control module 300. The processing for finding the gamut mapping LUT 603 is performed before the creation of a profile, as in the case of the creation of the DeviceRGB to Lab colorimetric value table 604 described previously and the gamut mapping LUT 603 is stored on the HDD 101 via the gamut mapping LUT saving unit 307. FIG. 7 is a diagram showing a processing flow for finding the gamut mapping LUT 603.

In gamut mapping LUT creation processing 700, first, the Lab grid point values are generated in accordance with the number of grid points specified in the parameter setting. For example, when the number of grid points is 33×33×33, the values of L, a, and b are taken so that the value of L is incremented by every 3.125 from 0 to 100 and the values of a and b are incremented by every 8 from −128 to 128, and the values are generated in ascending order of b, a, and L. It is to be understood that the number of grid points is not limited to 33×33×33 as in the case of the grid point of the profile. Then, the Lab vector value (unit vector), which is the amount of shift for the Lab value generated on the grid point is calculated and the correspondence relationship between the Lab grid point value and the calculated Lab vector value is set as the gamut mapping LUT 603. The created gamut mapping LUT 603 is stored in the HDD 101 via the gamut mapping LUT saving unit 307. In this manner, the unit vector is allocated to each grid point on the uniform color space.

Figure 8:
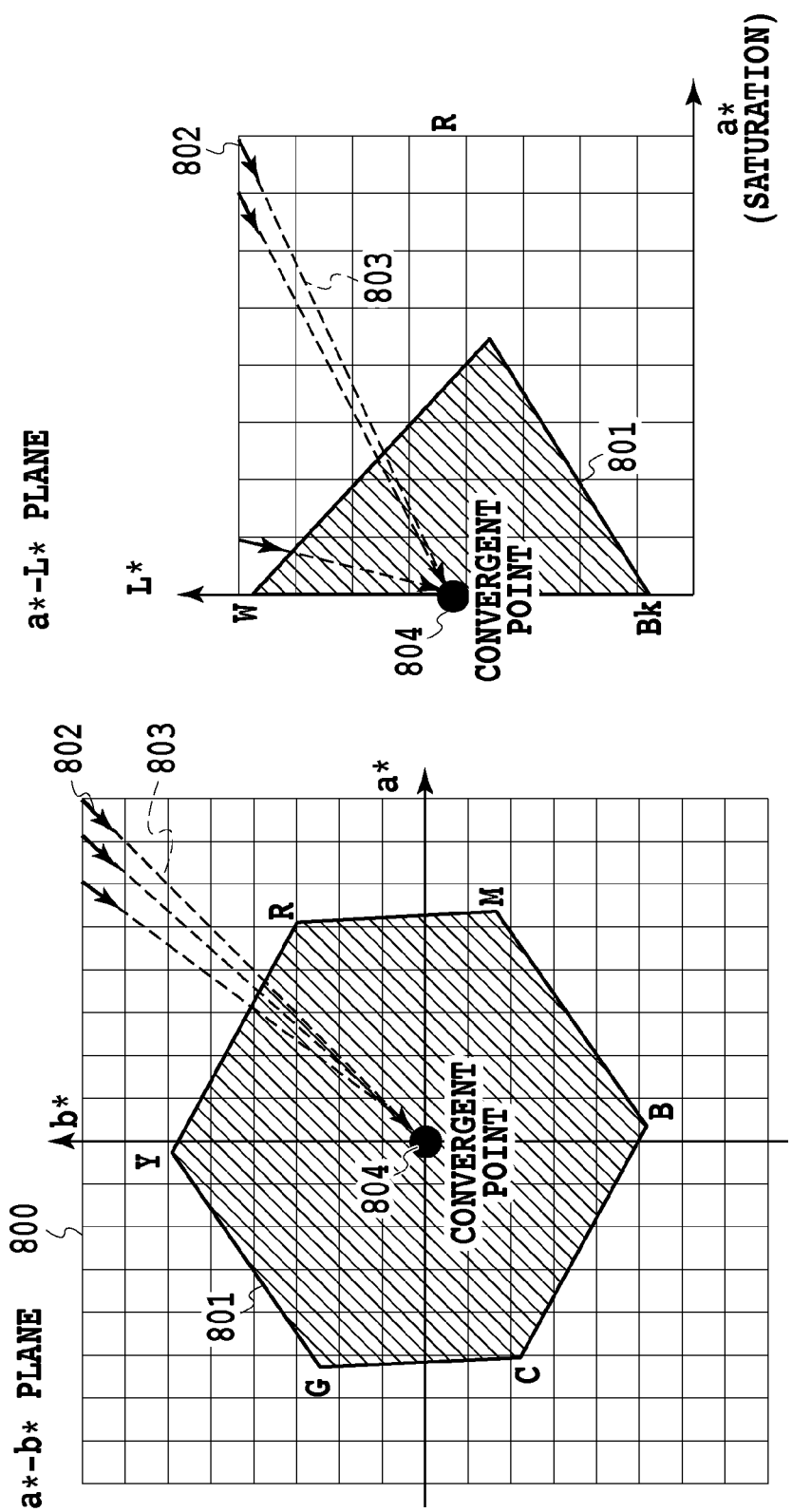
FIGS. 8A and 8B are explanatory diagrams of a gamut mapping lookup table.

FIGS. 8A and 8B are explanatory diagrams of the gamut mapping LUT 603 and FIG. 8A shows the projection of the Lab color space onto the a*-b* plane and FIGS. 8B shows the projection onto the a*-L* plane, respectively. A grid 800 on the projection in FIGS. 8A and 8B indicates the grind points that uniformly divide the Lab color space, but for the sake of simplicity of explanation, not all the grind points are shown. An area 801 indicated by slashes in FIGS. 8A and 8B indicates the printer color reproduction range.

In the present embodiment, a straight line (indicated by a broken line in FIGS. 8A and 8B) 803 that connects each Lab grid point and a convergent point 804 located in the center (origin) of the printer color reproduction range 801 is assumed and a unit vector toward the convergent point 804 along the straight line is allocated. Specifically, the procedure is as follows.

The convergent point 804 is found from the DeviceRGB to Lab colorimetric value table 604 that is read. Lab colorimetric value (Lw, aw, bw) corresponding to DeviceRGB (255, 255, 255) and Lab colorimetric value (Lk, ak, bk) corresponding to DeviceRGB (0, 0, 0) are taken out and the convergent point 804 is set as ((Lw+Lk)/2, 0, 0).

Based on the coordinates of each grid point (Lg, ag, bg) and the convergent point 804, a unit vector along the direction of a vector ((Lw+Lk)/2−Lg, ag, bg) is calculated by using Expression (1) below.

$$((Lw+Lk)/2-Lg, ag, bg)/|((Lw+Lk)/2-Lg, ag, bg)| \quad \text{Expression (1)}$$

The calculated unit vector is allocated to the grid point (Lg, ag, or bg).

By applying such processing to all the grid points, the gamut mapping LUT 603 is created.

Next, details of the gamut mapping processing 600 performed in the profile creation flow will be explained.

Figure 9:
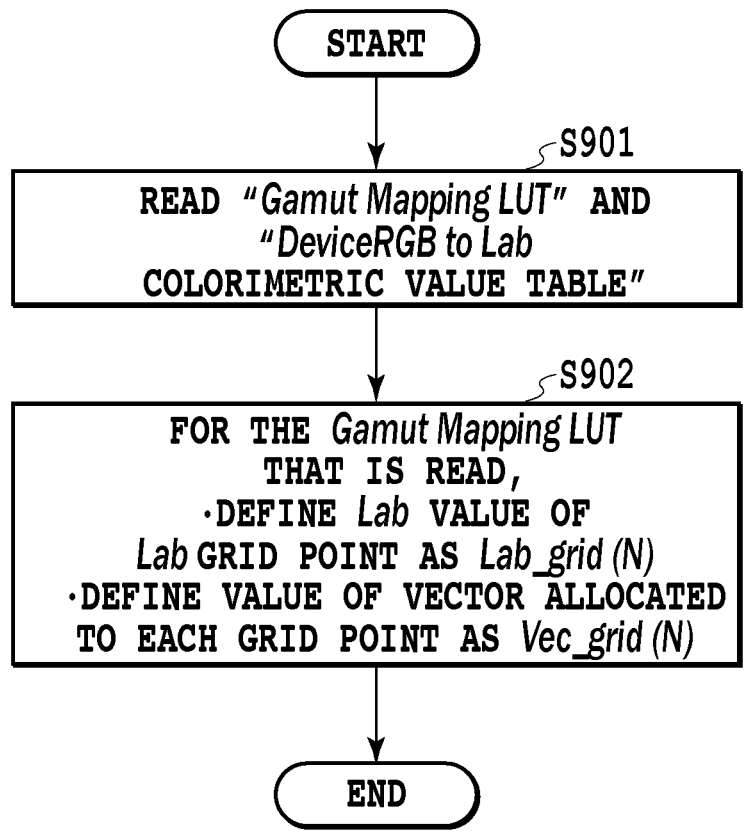
FIG. 9 is a flowchart showing a flow of initialization processing for gamut mapping.

When performing the gamut mapping processing 600, it is necessary to perform initialization at the time of start of the profile creation flow. Therefore, this initialization processing will be explained first. FIG. 9 is a flowchart showing a flow of initialization processing for gamut mapping.

In step S901, the CPU 105 reads, from the HDD 101, the gamut mapping LUT 603 and the DeviceRGB to Lab colorimetric value table 604, which is information necessary for the gamut mapping processing 600.

In step 902, the CPU 105 defines a variable for the gamut mapping LUT 603 that is read. Specifically, when it is assumed that the number of grid points of the gamut mapping LUT 603 that is read is N, the Lab value of the Lab grid point is defined as $Lab_{13}$ grid (N) and the value of the vector allocated to each grid point as Vec_grid (N). When such definition is completed, the initialization processing for the gamut mapping is completed.

Figure 10:
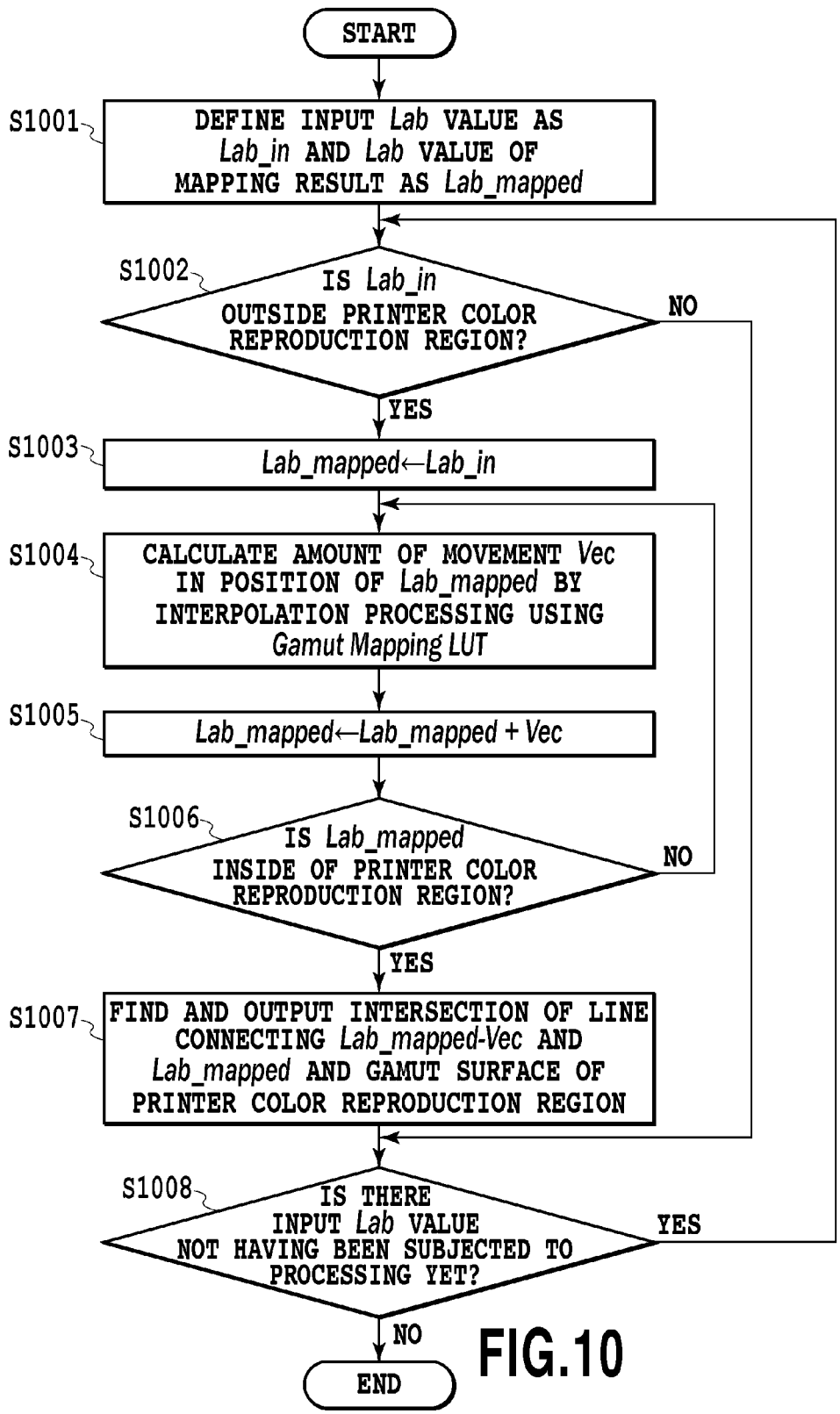
FIG. 10 is a flowchart showing details of gamut mapping processing.

Following the above, the contents of the gamut mapping processing 600 will be explained. FIG. 10 is a flowchart showing details of the gamut mapping processing 600. In the following explanation, it is assumed that addition/subtraction all mean operations of vector values.

In step 1001, the CPU 105 defines a Lab value that is input (input color value) as Lab_in, and a Lab value that is output (output color value) as Lab_mapped. In this case, the "Lab value that is input" is the Lab grid point value on which mapping is based, generated by the profile creation operation module 305 and the "Lab value that is output" is the Lab value that is the mapping result.

In step 1002, the CPU 105 determines whether arbitrary Lab_in (=arbitrary Lab value that is input) is outside or inside of the printer color reproduction range. This determination of whether the variable is outside or inside of the printer color reproduction range is achieved by investigating the relationship between the straight line that connects Lab_in and the convergent point and the gamut surface of the printer color reproduction range (plane corresponding to the outermost core of the DeviceRGB to Lab colorimetric value table 604). That is, when the straight line that connects Lab_in and the convergent point does not intersect with the gamut surface of the printer color reproduction range, Lab_in is determined to be inside of the printer color reproduction range. In contrast, when the straight line that connects Lab_in and the convergent point intersects with the gamut surface of the printer color reproduction range, Lab_in is determined to be outside the printer color reproduction range. Meanwhile, it may be possible to check whether the straight line intersects with the entire gamut surface of the printer color reproduction range, but it may also be possible to check only whether the straight line intersects with a specific plane except for the gamut surface having almost no possibility of intersection. When arbitrary Lab_in is determined to be outside the printer color reproduction range by such a check, the procedure proceeds to step 1003. In contrast, when arbitrary Lab_in is determined to be inside of the printer color reproduction range, the procedure proceeds to step 1008 because it is not necessary to perform processing in subsequent step 1003 to step 1007.

In step 1003, the CPU 105 substitutes Lab_in for Lab_mapped.

In step 1004, the CPU 105 calculates an amount of shift (unit vector) Vec in the position of Lab_mapped by interpolation processing using the gamut mapping LUT 603. The gamut mapping LUT 603 is a lookup table in which the Lab value is set as the grid point, and the already known LUT interpolation processing for three-dimensional input and three-dimensional output can be used. It is only required to find the amount of shift Vec in the position of Lab_mapped, and thus any method of interpolation processing may be used.

In step 1005, the CPU 105 adds the calculated amount of shift Vec to Lab_mapped.

In step 1006, the CPU 105 determines whether Lab_mapped to which the amount of shift Vec is added is outside or inside of the printer color reproduction range. The determination of whether Lab_mapped is outside or inside of the printer color reproduction range in this case is substantially the same as the processing in step 1002 described above. That is, the determination is achieved by investigating the relationship between the straight line that connects Lab_mapped and the convergent point and the gamut surface of the printer reproduction region. When Lab_mapped to which the amount of shift Vec is added is determined to be outside the printer color reproduction range, the procedure returns to step 1004. In contrast, when Lab_mapped is determined to be inside of the printer color reproduction range, the procedure proceeds to step 1007.

In step 1007, the CPU 105 finds the color value of the point at which the straight line connecting "Lap_mapped-Vec" before the amount of shift Vec is added in step 1005 and "Lap_mapped" intersects with the gamut surface and outputs the value as the Lab value after mapping.

In step 1008, the CPU 105 determines whether or not there is an input Lab value not having been processed. When there is an input Lab value not having been processed, the procedure returns to step 1002. In contrast, when the processing for all the input Lab values is completed, the present processing is exited.

By the above processing, the output color value (Lab value) after mapping corresponding to a given input color value (Lab value) is obtained.

FIGS. 11A and 11B are diagrams showing an example of the result obtained by the color reproduction range compression processing as described above.

In FIGS. 11A and 11B, reference numeral 1101 represents the printer color reproduction range, the same as that represented by reference numeral 801 in FIGS. 8A and 8B. Meanwhile, the grid point in FIGS. 8A and 8B is the grid point of the gamut mapping LUT, but in contrast, the grid point in FIGS. 11A and 11B is the grid point of the profile. Here, the printer color reproduction range is shown schematically on the assumption that the grid point is the same. It can be seen that a Lab grid point 1100 shifts along a locus 1103 in accordance with a vector 1102 (unit vector 802 in FIGS. 8A and 8B) defined in the gamut mapping LUT 603 and converges on a point 1104 on the gamut surface of the printer color reproduction range 1101.

As described above, in the gamut mapping processing according to the present embodiment, the mapping destination of the input color value is specified more directly. Because of this, it is possible to perform gamut mapping without making complicated rule settings.

[Second Embodiment]

Next, as a second embodiment, a method of creating a gamut mapping lookup table capable of performing fine shift control on the uniform color space will be explained.

Figure 12B:
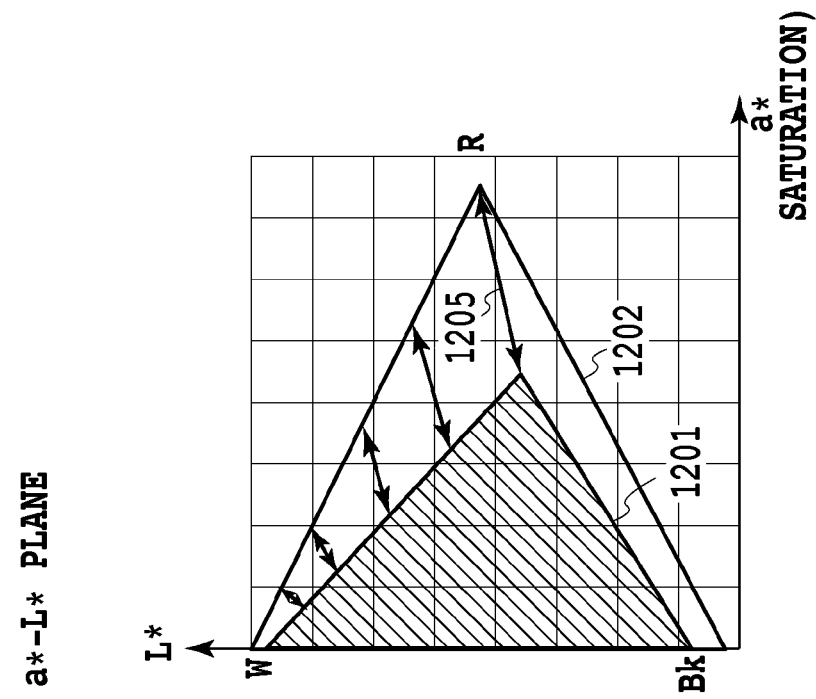
FIGS. 12A and 12B are diagrams schematically each showing the definition of a mapping correspondence relationship.
Figure 12A:
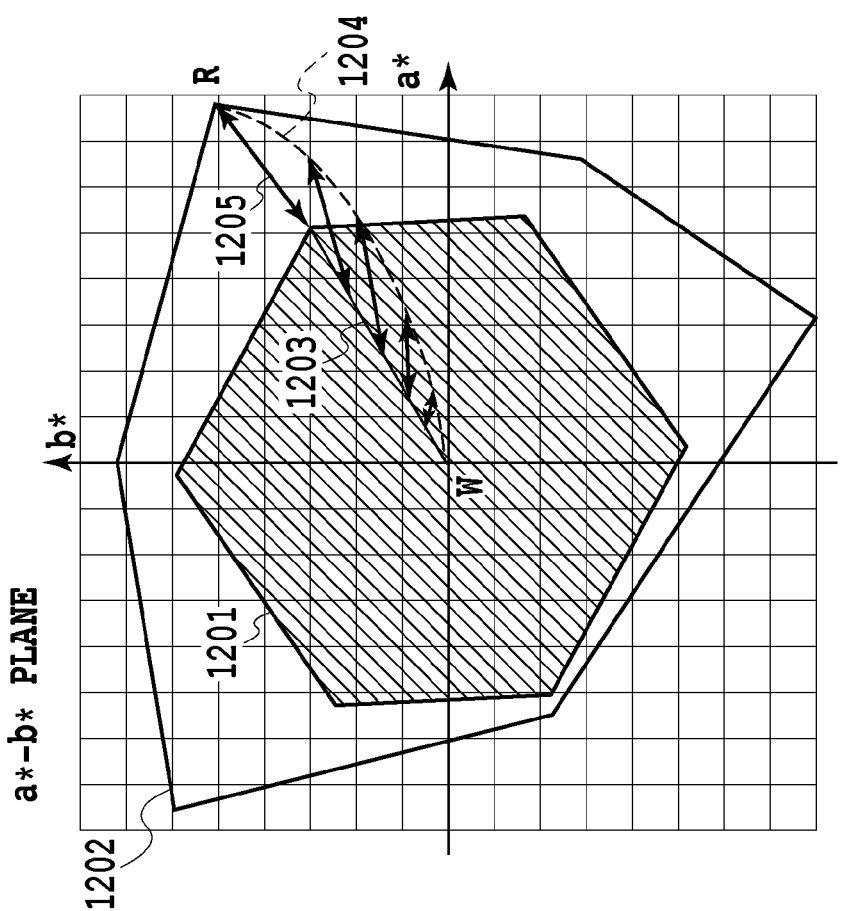

The creation of a gamut mapping LUT according to the present embodiment requires a correspondence relationship between the color value (specific Lab value) on the gamut surface of the source color reproduction range on which mapping is based and the color value (Lab value to be targeted after mapping) on the gamut surface of the printer color reproduction range. FIGS. 12A and 12B are diagrams schematically showing the definition of such a correspondence relationship.

In FIGS. 12A and 12B, a shaded region 1201 represents the printer color reproduction range and a region 1202 outside the region 1201 represents the source color reproduction range. In this case, a segment 1203 connects White and Red on the gamut surface of the printer color reproduction range 1201 and a curve 1204 represented by a broken line connects White and Red on the gamut surface of the source color reproduction range 1202.

In such circumstances, when the colors from White to Red in the source color reproduction range 1202 are reproduced by colors from White to Red in the printer color reproduction range 1201, a plurality of correspondence relationships of mapping is defined in the present embodiment. Specifically, a plurality of pieces of information (represented by a double-pointed arrow 1205) of corresponding points indicating that a point on the gamut surface of the source color reproduction range 1202 corresponds to which point on the gamut surface of the printer color reproduction range 1201 is defined.

Next, a method of constructing the gamut mapping LUT 603 that implements the mapping correspondence relationship defined as described above will be explained.

Figure 13B:
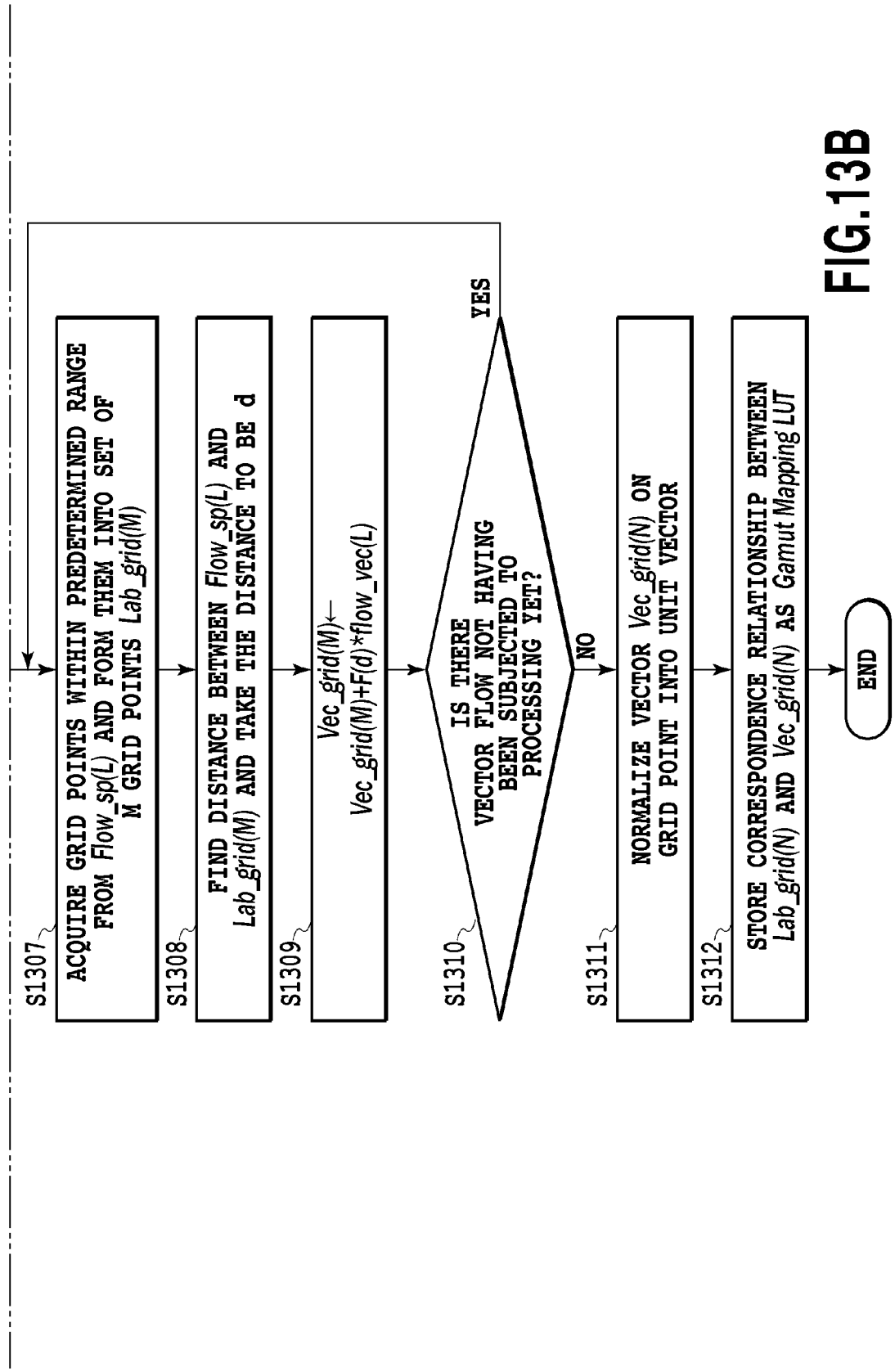
FIG. 13 is a flowchart showing a relationship between FIGS. 13A and 13B, and FIGS. 13A and 13B are flowcharts showing a flow of gamut mapping lookup table creation processing according to a second embodiment.

FIGS. 13A and 13B are flowcharts showing showing a flowchart of processing in the gamut mapping LUT creation processing 700 in which the above-described mapping correspondence relationship and the DeviceRGB to Lab colorimetric value table 604 are input.

In step S1301, the CPU 105 reads the DeviceRGB to Lab colorimetric value table 604 and initializes the gamut mapping LUT in accordance with the specified number of grid points. In the initialization performed here, it may be possible to allocate a vector having a direction toward the convergent point within the printer color reproduction range, to each grid point by, for example, the method explained in the first embodiment or it may also be possible to read the gamut mapping LUT created and saved in advance as initial values. By the latter method, it is possible to save time and effort required to create the gamut mapping LUT from scratch, each time.

In step 1302, the CPU 105 defines the Lab value of the Lab grid point of the initialized gamut mapping LUT as Lab_grid (N) and the vector allocated to each grid point as Vec_grid (N). N represents the number of grid points such as 33×33×33.

In step 1303, the CPU 105 reads the information of the mapping correspondence relationship (corresponding points). The larger number of combinations representing the mapping correspondence relationship (the number indicated by the double-pointed arrow 1205 in FIGS. 12A and 12B) is more desirable and it is more desirable if the points are across the entire color space.

In step 1304, the CPU 105 generates a plurality (L) of unit vectors that configure a line connecting the start point and the destination point for each of all the mapping corresponding points that are read and finds the start position of each unit vector. The line that connects the start point and the destination point in this case is a straight line.

In step 1305, the CPU 105 saves the start position of the L unit vectors that are generated as flow_sp (L), the unit vector quantity as flow_vec (L), and the set of the unit vectors configuring the line as a vector flow. FIGS. 14A and 14B are diagrams showing an example of the vector flow saved in this step and it can be seen that each vector flow 1401 corresponding to the double-pointed arrow 1205 in FIGS. 12A and 12B is generated.

In step 1306, the CPU 105 determines whether there is a mapping correspondence relationship (combination of corresponding points) not having been processed. When there is a corresponding point not having been processed, the procedure returns to step 1304 and the processing in step 1304 and step 1305 is repeated on the next corresponding point. When the vector flows of all the corresponding points are obtained, the procedure proceeds to step 1307.

In step 1307, the CPU 105 acquires a grid point within a range of a predetermined distance D from flow_sp (L) from the set of the grid points Lab_grid (N) about the unit vectors configuring the vector flow. Then, the CPU 105 defines the M Lab grid points that are acquired as Lab_grid (M). Here, it is desirable for the distance D to be a value at least twice or more the value of the distance between the Lab grid points so that the definition of the corresponding point affects the Lab grid point.

In step 1308, the CPU 105 finds a distance d between Lab_grid (M) and flow_sp (L).

In step 1309, the CPU 105 multiplies flow_vec (L) by a F (d), which is a function of the distance d, and then adds the product to the vector Vec_grid (M) on the grid point corresponding to Lab_grid (M). Here, the F (d) is a function expressed by, for example, Expression below which takes a maximum value of 1 when the distance is 0 and in which the value becomes smaller as the distance becomes larger.

$$F(d) = 1/(d^4 + 1)$$ Expression (2)

Figure 15:
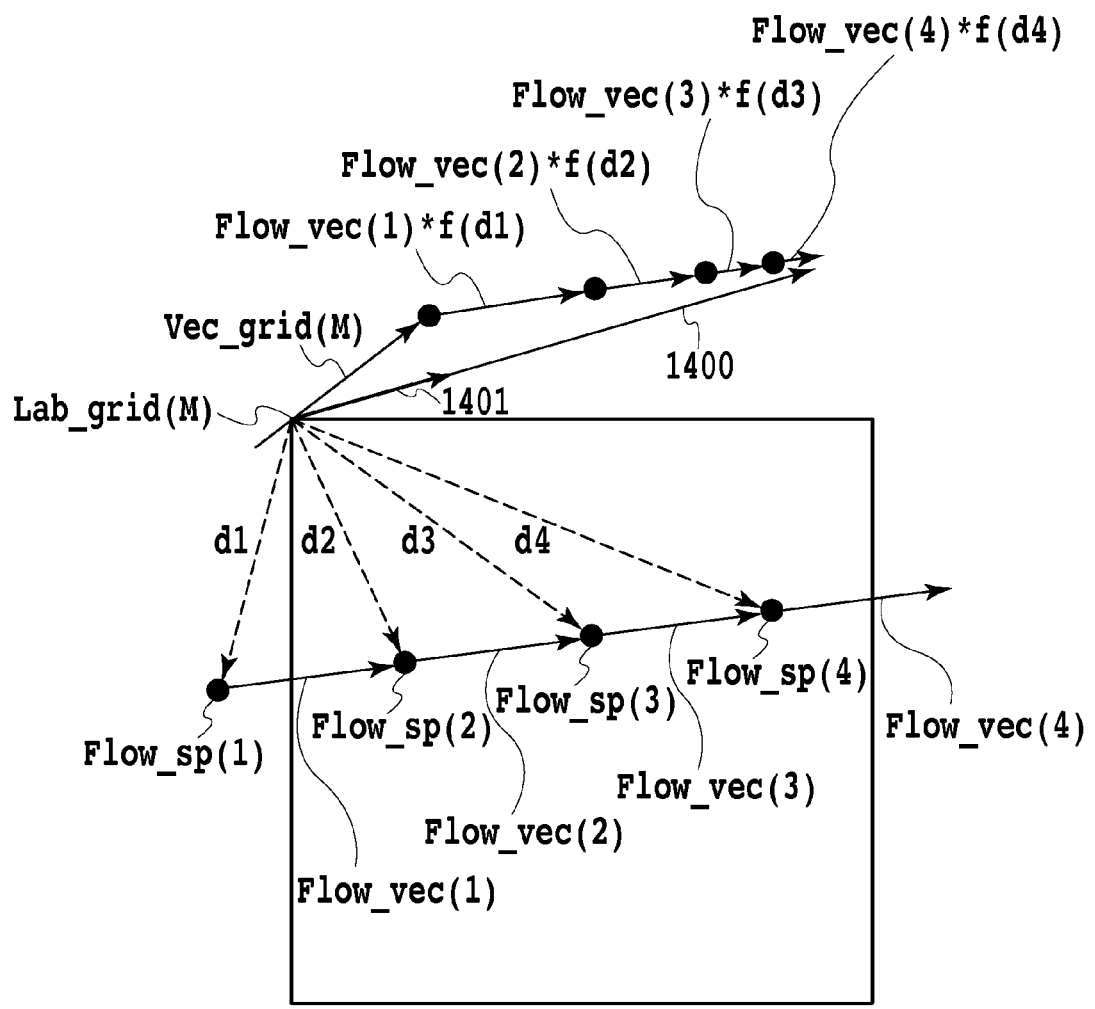
FIG. 15 is a diagram schematically showing the way a vector changes on a Lab color space.

Here, FIG. 15 is a diagram schematically showing the way the vector changes on the Lab color space by the processing in step 1307 to step 1309.

For the sake of simplification, the influence of four Flow_vecs on Vec_grid (M) on the grid point Lab_grid (M) will be explained.

If the distance from Flow_sp (1) to Lab grid (M) is set as d1, the influence of Flow_vec (1) on the vector on $Lab_{13}$ grid (M) is the addition of Flow_vec (1)*f (d1). In the same way, Flow_vec (2) to Flow_vec (4) are added sequentially as a weight. This is expressed by Expression as follows.

$$\text{Vec\_grid}\,(M) = \text{Vec\_grid}\,(M) + \text{Flow\_vec}\,(1) *$$ Expression (3)
$$f\,(d1) + \text{Flow\_vec}\,(2) * f\,(d2) +$$
$$\text{Flow\_vec}\,(3) * f\,(d3) +$$
$$\text{Flow\_vec}\,(4) * f\,(d4)$$

Then, eventually, Vec_grid (M) on Lab$_{13}$ grid (M) becomes a vector 1400 and it is seen that the Vec_grid (M) comes closer in the direction of the vectors represented by Flow_vec (1) to Flow_vec (4).

Finally, the vector 1400 obtained by the above-mentioned addition is converted into unit vector and thus the vector 1401 is obtained.

Explanation is returned to the flow in FIG. 13B.

In step 1310, the CPU 105 determines whether there is a vector flow not having been processed. When there is a vector flow not having been processed, the procedure returns to step 1307 and the processing in step 1307 to 1309 is repeated on the next vector flow. When the processing for all the vector flows is completed, the procedure proceeds to step 1311.

In step 1311, the CPU 105 converts Vec_grid (N) associated with all the Lab grid points Lab_grid (N) into unit vector (normalization).

In step 1312, the CPU 105 saves the correspondence relationship between Lab_grid (N) and Vec_grid (N) as the gamut mapping LUT 603, in the HDD 101 via the gamut mapping LUT saving unit 307.

By such processing, it is possible to reflect the orientation of the mapping correspondence relationship (corresponding points) in the unit vector allocated on the Lab grid point and to correct the orientation of the unit vector to a more appropriate orientation. Furthermore, by increasing the number of pieces of information of the mapping correspondence relationship to be prepared, it becomes possible to create a gamut mapping LUT for more precise gamut mapping.

[Third Embodiment]

In the second embodiment, the mapping correspondence relationship is defined by two corresponding points (two points, that is, a point on the gamut surface of the source color reproduction range and a point on the gamut surface of the printer color reproduction range). Following the above, as a third embodiment, an aspect in which the mapping correspondence relationship is defined by three or more points in total including one or more relay points connecting the corresponding points will be explained.

Figure 16:
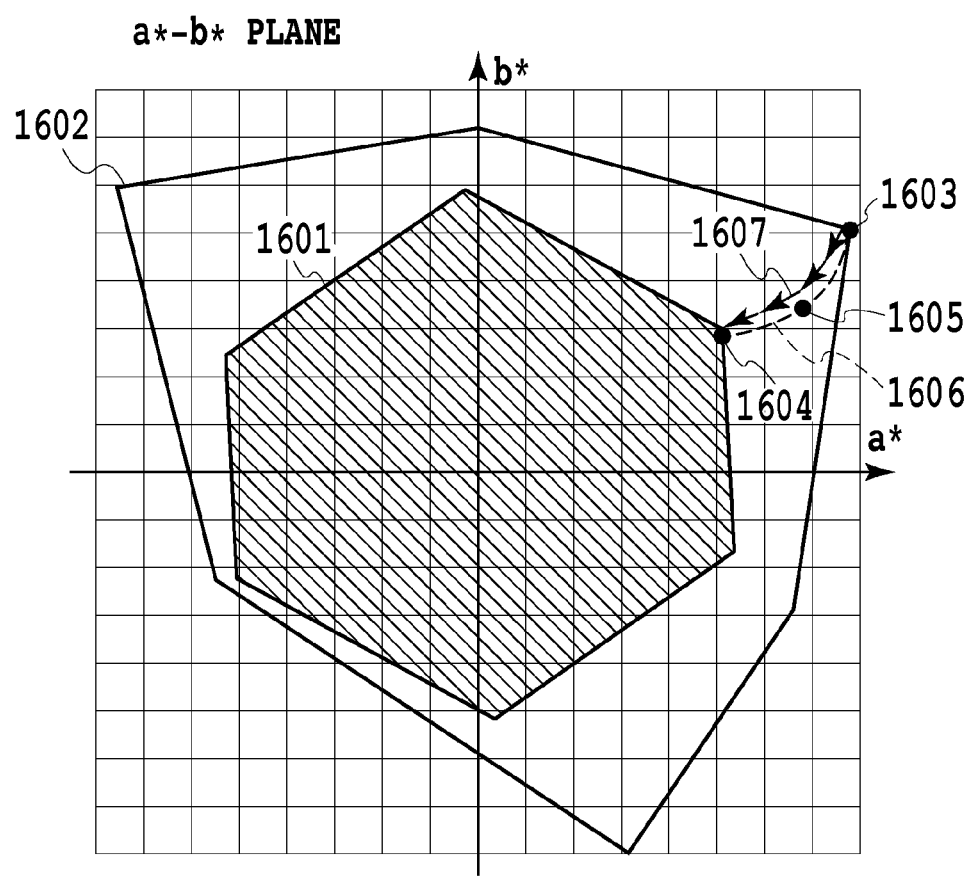
FIG. 16 is a diagram showing an example of a mapping correspondence relationship according to a third embodiment.

FIG. 16 is a diagram showing an example of a mapping correspondence relationship prepared in the present embodiment. In FIG. 16, reference numeral 1601 represents a printer color reproduction range and 1602 a source color reproduction range. Then, between a point (start point of the mapping correspondence relationship) 1603 on the gamut surface of the source color reproduction range 1602 and a point (destination point of the mapping correspondence relationship) 1604 on the gamut surface of the printer color reproduction range 1601, there exists a relay point 1605. A line that connects these three points (a curve 1606 represented by a broken line here) is found by, for example, spline interpolation and defined as a mapping correspondence relationship. Here, the case where the number of relay points is one will be explained, but when the number of relay points is large, it may also be possible to define a mapping correspondence relationship by a divided straight line that sequentially connects from the start point to the destination point of the corresponding points, via each relay point.

By approximating the curve 1606 obtained in this manner using a plurality of unit vectors, a vector flow 1607 is obtained. Then, by performing the processing in step 1307 and subsequent steps in FIG. 13B, it is possible to reflect the orientation of the mapping correspondence relationship including the relay points in the Lab vector value (unit vector), which is the amount of shift on the Lab grid point.

FIGS. 17A and 17B are flowcharts showing a flow of the processing in the gamut mapping LUT creation processing 700 according to the present embodiment. The same parts as those in the second embodiment already described will be explained briefly or not explained and different points will be explained mainly here.

In step 1701, the CPU 105 reads the DeviceRGB to Lab colorimetric value table 604 and initializes the gamut mapping LUT in accordance with the specified number of grid points.

In step 1702, the CPU 105 defines the Lab value of the Lab grid point of the initialized gamut mapping LUT as Lab_grid (N) and the vector to be allocated to each grid point as Vec_grid (N).

In step 1703, the CPU 105 reads the information of the mapping correspondence relationship, that is, the information of the corresponding points (start point, destination point) and the relay points.

In step 1704, the CPU 105 finds a line (curve) from the start point to the destination point through the relay point(s).

In step 1705, the CPU 105 finds the start position of each unit vector by approximating the curve that is found, by a plurality (L) of unit vectors.

In step 1706, the CPU 105 saves the start positions of the L unit vectors generated as flow_sp (L), the unit vector quantity as flow_vec (L), and the curve configured by these unit vectors as a vector flow.

In step 1707, the CPU 105 determines whether there is a mapping correspondence relationship not having been processed and when there is a corresponding point not having been processed, the procedure returns to step 1704 and the processing in step 1704 to step 1706 is repeated. When there is not a mapping correspondence relationship not having been processed, the procedure proceeds to step 1708. The processing in step 1708 to step 1713 is the same as the processing in step 1307 to step 1312 in FIG. 13, and thus explanation is omitted.

By such processing, it becomes possible to create a gamut mapping LUT more accurate than that in the second embodiment.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-112655, filed May 19, 2011, which is hereby incorporated by reference herein in its entirety.

What is claimed is:

1. A method of compressing a color reproduction range, the method comprising the steps of:

allocating a vector representing a direction in which a color value on a grid point should shift in a uniform color space, to each grid point of a plurality of grid points on the uniform color space; and finding a direction of shift for an input color value on the uniform color space based on the vector which is respectively allocated to each grid point and mapping the input color value to a color reproduction range of an output device.

2. The method of compressing a color reproduction range according to claim 1, wherein
the mapping step includes, for an input color value on the uniform color space:
a) finding a direction of shift for one input color value by interpolation processing using the vector;
b) shifting the input color value by an amount corresponding to the vector in the direction of shift that is found;
c) outputting a color value in the color reproduction range when the input color value after the shift is within the color reproduction range of the output device or using the color value after the shift as the next input color value when the input color value after the shift is outside the color reproduction range of the output device; and
d) repeating the steps a) to c) for all the input color values.

3. The method of compressing a color reproduction range according to claim 1, wherein
the step of allocating the vector includes the steps of:
allocating a vector toward the origin of the uniform color space to each grid point on the uniform color space;
defining a correspondence relationship between a specific input color value on the gamut surface of a source color reproduction range and a specific output color value on the gamut surface of the color reproduction range of the output device; and
correcting the orientation of the vector toward the origin based on the defined correspondence relationship.

4. The method of compressing a color reproduction range according to claim 3, wherein
the correcting step corrects the orientation of the vector toward the origin by:
a) defining a line connecting the specific input color value and the specific output color value in the defined correspondence relationship;
b) finding a unit vector configuring the defined line;
c) acquiring a grid point within a predetermined range from the start position of the unit vector that is found, calculating a distance between the acquired grid point and the start position, adding the vector multiplied by a weight based on the calculated distance, to the vector of the acquired grid point, and turning the vector acquired by the addition into a unit vector; and
d) repeating the steps a) to c) for all the defined correspondence relationships.

5. The method of compressing a color reproduction range according to claim 4, wherein
the correspondence relationship is defined by using a color value of a relay point connecting the input color value and the output color value, and
the line is defined as a line from the specific input color value to the specific output color value via the color value of the relay point.

6. A profile creation device comprising:
a compressing unit configured to compress a color reproduction range by using the method of compressing a color reproduction range according to claim 1; and
a converting unit configured to convert a color value on a uniform color space compressed by the compressing unit, into a color value of a color space dependent on the output device.

7. A non-transitory computer readable storage medium storing a program for causing a computer to perform the method of compressing a color reproduction range according to claim 1.

* * * * *